US006757371B2

(12) United States Patent
Kim et al.

(10) Patent No.: US 6,757,371 B2
(45) Date of Patent: Jun. 29, 2004

(54) METHOD FOR DIVISIONAL BILLING AND DEVICE THEREOF

(75) Inventors: Yeon-Kil Kim, Seoul (KR); Chan-Kyum Kim, Seoul (KR); Hyung-Yong Kim, Seoul (KR)

(73) Assignee: KTFreetel Co., Ltd., Seoul (KR)

( * ) Notice: Subject to any disclaimer, the term of this patent is extended or adjusted under 35 U.S.C. 154(b) by 63 days.

(21) Appl. No.: 10/277,895

(22) Filed: Oct. 23, 2002

(65) Prior Publication Data

US 2004/0081302 A1 Apr. 29, 2004

(51) Int. Cl.⁷ .................... H04M 15/00; H04M 3/42; H04M 7/38
(52) U.S. Cl. .................. 379/114.22; 379/114.03; 379/116; 379/121.03; 379/124; 455/406
(58) Field of Search .................. 379/111, 112.01, 379/112.06, 112.09, 114.01, 114.03, 114.05, 114.22, 114.26, 115.02, 116, 118, 121.03, 121.05, 124; 455/406, 407

(56) References Cited

U.S. PATENT DOCUMENTS

| | | | | |
|---|---|---|---|---|
| 5,381,467 A | * | 1/1995 | Rosinski et al. | 379/121.01 |
| 5,579,379 A | * | 11/1996 | D'Amico et al. | 379/114.01 |
| 5,602,907 A | * | 2/1997 | Hata et al. | 379/114.22 |
| 5,646,984 A | * | 7/1997 | Oda | 379/114.22 |
| 5,822,411 A | * | 10/1998 | Swale et al. | 379/114.22 |
| 5,898,918 A | | 4/1999 | Leppänen | 455/414 |
| 5,937,044 A | * | 8/1999 | Kim | 379/121.05 |
| 5,960,070 A | * | 9/1999 | O'Donovan | 379/114.01 |
| 6,028,918 A | * | 2/2000 | Lehmacher et al. | 379/114.22 |
| 6,058,170 A | * | 5/2000 | Jagadish et al. | 379/119 |
| 6,282,274 B1 | | 8/2001 | Jain et al. | 379/114 |
| 6,353,663 B1 | * | 3/2002 | Stevens et al. | 379/114.22 |
| 6,373,931 B1 | * | 4/2002 | Amin et al. | 379/121.01 |
| 6,430,279 B2 | * | 8/2002 | Sawatzki et al. | 379/144.01 |
| 6,442,257 B1 | * | 8/2002 | Gundlach | 379/114.01 |
| 6,483,910 B1 | * | 11/2002 | Council | 379/127.01 |
| 6,493,438 B1 | * | 12/2002 | Gross et al. | 379/114.22 |

FOREIGN PATENT DOCUMENTS

WO    WO 02/01846    1/2002    .......... H04M/15/00

* cited by examiner

*Primary Examiner*—Binh Tieu
(74) *Attorney, Agent, or Firm*—Finnegan, Henderson, Farabow, Garrett & Dunner, L.L.P.

(57) ABSTRACT

The present invention relates to a method for billing and a device thereof and more particularly relates to the method and the device for dividing the monthly charges of each subscriber into a personal-use portion and a business-use portion according to the predetermined criteria and divisionally billing each subscriber for the personal-use portion and the entity that will pay for each subscriber regarding the sum of business-use portion. The method for dividing charges of the present invention comprises the steps of extracting call detail record(CDR) in a predetermined period corresponding to each divisional-payment subscriber, calculating the charge corresponding to each divisional-payment subscriber's usage in a first portion of the charge for charging to the divisional-payment subscriber and a second portion of the charge for charging to the divisional-payment company, by using the CDR and divisional-payment criteria registered in advance and calculating a total charge of divisional-payment subscribers engaged in the divisional-payment company by summing up the second portion of charge corresponding to each subscriber.

13 Claims, 14 Drawing Sheets

FIG. 5

| NUMBER | FIELD NAME | EXAMPLE | | |
|---|---|---|---|---|
| 1 | BILLING ACCOUNT | 21499 | 218707 | 232100 |
| 2 | CONSECUTIVE NUMBERS OF BILL | 3 | 9 | 18 |
| 3 | CUSTOMER NUMBER | 000-000-0000 | 111-111-1111 | 222-222-2222 |
| 4 | START DATE TO CALCULATE | 02/20/2001 | 02/11/2001 | 03/1/2001 |
| 5 | END DATE TO CALCULATE | 03/20/2001 | 03/11/2001 | 04/1/2001 |
| 6 | DIVISIONAL-PAYMENT OR NOT | Y | Y | Y |
| 7 | METHOD OF DIVISIONAL-PAYMENT | T | A | A |
| 8 | TARGET OF DIVISIONAL-PAYMENT | C | C | C |
| 9 | COMPANY CODE | 178452 | 178452 | 178452 |
| 10 | METHOD OF PAYMENT BY COMPANY | D | D | D |
| 11 | START TIME TO WORK | 090000 | NULL | NULL |
| 12 | END TIME TO WORK | 180000 | NULL | NULL |
| 13 | FIXED PAYMERT METHOD | NULL | B | R |
| 14 | RATE OF DIVISIONAL-PAYMENT | NULL | NULL | 50 |

| NUMBER | FIELD NAME | EXAMPLE | | |
|---|---|---|---|---|
| 1 | BILLING ACCOUNT | 21499 | 218707 | 232100 |
| 2 | CONSECUTIVE NUMBERS OF BILL | 3 | 9 | 18 |
| 3 | CUSTOMER NUMBER | 000-000-0000 | 111-111-1111 | 222-222-2222 |
| 4 | START DATE TO CALCULATE | 02/20/2001 | 03/11/2001 | 04/1/2001 |
| 5 | END DATE TO CALCULATE | 03/20/2001 | 03/11/2001 | 04/1/2001 |
| 6 | DIVISIONAL-PAYMENT OR NOT | Y | Y | Y |
| | ⋮ | | | |

606

610

| NUMBER | FIELD NAME | EXAMPLE | | |
|---|---|---|---|---|
| 1 | BILLING ACCOUNT | 21499 | 218707 | 232100 |
| 2 | CUSTOMER NUMBER | 000-000-0000 | 111-111-1111 | 222-222-2222 |
| 3 | METHOD OF DIVISIONAL-PAYMENT | T | A | A |
| 4 | TARGET OF DIVISIONAL-PAYMENT | C | C | C |
| 5 | COMPANY CODE | 178452 | 178452 | 178452 |
| 6 | METHOD OF PAYMENT BY COMPANY | D | D | D |
| 7 | START TIME WORK | 090000 | NULL | NULL |
| 8 | END TIME WORK | 180000 | NULL | NULL |
| 9 | FIXED PAYMENT METHOD | NULL | B | A |
| 10 | FIXED PORTION | NULL | NULL | 50 |

FIG. 7

| NUMBER | FIELD NAME |
|---|---|
| 1 | BILLING ACCOUNT |
| 2 | CONSECUTIVE NUMBER OF SETTLEMENT |
| 3 | SETTLEMENT CLASSIFICATION |
| 4 | OCCURRENCE DATE OF SETTLEMENT |
| 5 | SETTLEMENT AMOUNT |
| 6 | CONSECUTIVE NUMBER OF BILL REFLECTED SETTLEMENT |
| 7 | SETTLING TARGET |

FIG. 8

| NUMBER | FIELD NAME |
|---|---|
| 1 | BILLING ACCOUNT |
| 2 | CONSECUTIVE NUMBER OF BILL |
| 3 | DATE OF TRANSACTING BILL |
| 4 | DATE OF SUBMITTING BILL |
| 5 | DATE OF PAYMENT |
| 6 | CHARGING AMOUNT OF THE LAST MONTH |
| 7 | RECEIPTING AMOUNT OF THE LAST MONTH |
| 8 | INCREASING AMOUNT OF THE LAST MONTH |
| 9 | SETTLING AMOUNT OF THE LAST MONTH BILL |
| 10 | NONPAYMENT AMOUNT OF THE LAST MONTH |
| 11 | NONPAYMENT AMOUNT OF ARREAR TARGET |
| 12 | TOTAL CHARGING AMOUNT |
| 13 | PAYMENT METHOD |

FIG. 9

| NUMBER | FIELD NAME |
|---|---|
| 1 | BILLING ACCOUNT |
| 2 | CONSECUTIVE NUMBER OF RECEIPTING |
| 3 | DATE OF TRANSACTING OF RECEIPTING |
| 4 | BANK CODE |
| 5 | RECEIPTING METHOD |
| 6 | DETAIL RECEIPTING METHOD |
| 7 | CREDIT CARD NUMBERS |
| 8 | CARD ADMISSION NUMBERS |
| 9 | ACTUAL PAYMENT AMOUNT BY CUSTOMER |
| 10 | MEMBERSHIP NUMBERS |

FIG. 12

BILL FOR CUSTOMER — 1221

NUMBER : 000-000-0000

BASIC CHARGES : 10,000

CHARGES FOR USAGE AFTERWARD WORKING HOURS : 7,200

CHARGES USAGE WITHIN WORKING HOURS : 10,800

CHARGES USAGE WITHIN WORKING HOURS AND EXCEPT BUSINESS : 3,600

TOTAL CHARGES : 10,800

BILL FOR BRANCH OFFICE — 1222

| HEAD OFFICE CODE | B | TOTAL CHARGES | 000,000 |
|---|---|---|---|
| WORKING STAFF CODE | | CHARGES | |
| ⋮ | | | |
| 000-000-0000 | | 7,200 | |
| ⋮ | | | |

BILL FOR BRANCH OFFICE — 1223

| HEAD OFFICE CODE | H | TOTAL CHARGES | 000,000 |
|---|---|---|---|
| WORKING STAFF CODE | | CHARGES | |
| ⋮ | | | |
| 000-000-0000 | | 10,000 | |
| ⋮ | | | |

FIG. 13

CUSTOMER A

| NUMBERS: 000-000-0000 | USAGE PERIOD | 2.20~2.28 | |
|---|---|---|---|
| SENDING NUMBERS | START TIME FOR CALLING | END TIME FOR CALLING | CHARGES |
| 000-000-0001 | 09:31 | 09:51 | 4800 |
| 063-444-4444 | 13:03 | 13:18 | 3600 |
| 000-000-0002 | 23:10 | 23:40 | 7200 |

CUSTOMER B

| NUMBERS: 111-111-1111 | USAGE PERIOD | 2.11~2.28 | |
|---|---|---|---|
| SENDING NUMBERS | START TIME FOR CALLING | END TIME FOR CALLING | CHARGES |
| 111-11-111-11-1113 | 12:04 | 12:58 | 4800 |
| 02-111-1111 | 14:04 | 14:24 | 4800 |
| 032-111-1111 | 19:33 | 20:31 | 3600 |

CUSTOMER C

| NUMBERS: 222-222-2222 | USAGE PERIOD | 2.1~2.28 | |
|---|---|---|---|
| SENDING NUMBERS | START TIME FOR CALLING | END TIME FOR CALLING | CHARGES |
| 700-0000 | 13:13 | 13:23 | 4800 |
| 222-222-2222 | 08:09 | 08:19 | 2400 |
| 222-222-2223 | 20:21 | 20:36 | 3600 |

---

BILL FOR CUSTOMER A

| NUMBERS: 000-000-0000 |
|---|
| BASIC CHARGES: 10,000 |
| CHARGES FOR USAGE AFTERWARD WORKING HOURS: 7,200 |
| CHARGES USAGE WITHIN WORKING HOURS: 8,400 |
| TOTAL CHARGES: 17,200 |

BILL FOR CUSTOMER B

| NUMBERS: 111-111-1111 |
|---|
| BASIC CHARGES: 10,000 |
| CHARGES: 13,200 |
| TOTAL CHARGES: 13,200 |

BILL FOR CUSTOMER C

| NUMBERS: 222-222-2222 |
|---|
| BASIC CHARGES: 10,000 |
| CHARGES: 10,800 |
| TOTAL CHARGES: 10,400 |

BILL FOR COMPANY

| COMPANY CODE | TOTAL CHARGES | 28,800 |
|---|---|---|
| WORKING STAFF | PAYMENT BY PROXY | |
| A | 8,400 | |
| B | 10,000 | |
| C | 10,400 | |

METHOD FOR DIVISIONAL BILLING AND DEVICE THEREOF

TECHNICAL FIELD

The present invention relates to a method for billing and a device thereof and more particularly relates to the method and the device for dividing the monthly charges of each subscriber into a personal-use portion and a business-use portion according to the predetermined criteria and divisionally billing each subscriber for the personal-use portion and the entity that will pay for each subscriber for the sum of the business-use portion.

BACKGROUND OF THE INVENTION

Generally, a communication carrier provides a communication service to each subscriber and demands a charge/fee for the communication service to each subscriber.

Recently, along with the increase of subscribers, telecommunications are frequently being used for business. Also, as various service types of telecommunication become common, these days the telecommunications are used for not only voice call but also information search for business. In spite of this change in the business environment, a problem occurred since the subscriber had to pay the whole charge even if only some portion of the charge was for business.

Accordingly, in order to pay the charge for business, until now a company has allowed each employee to demand a fixed amount of charge for business to itself.

Hereinafter, the aforementioned method is described with the accompanying drawings.

FIG. 1 shows the conventional procedure of a divisional billing charge.

Referring to FIG. 1, according to the conventional procedure of a divisional billing charge, the telecommunication carrier 100 sends bills for payment 120 to each subscriber 110. The charge for using telecommunication service during a certain period (for example, a month), which is calculated by the billing system of the telecommunication carrier, is printed in the bill for payment 120.

First of all, the subscriber 110 paid the charge printed in the bill for payment 120 to the telecommunication carrier 100. After that, the subscriber could demand a portion of the charge to the company 140 according to the predetermined contract between the subscriber 110 and the company 140. Accordingly, if the company contracted with the subscriber to pay a basic charge, the subscriber 110 can demand the basic charge to the company 140.

When the company 140 receives demands of payment for the predetermined portion of the charge of the company from each subscriber 110, the company 140 pays the amount of money corresponding to the demand to each subscriber 110.

According to the aforementioned procedure, only when the bill for payment 130 is submitted to the company 140, the charge for business can be refunded to the subscriber 110. However, this procedure to submit the bill for payment to the company in order to receive the refunds was troublesome.

Also, because it is difficult for the company to estimate each employee's charge for business, there is no alternative except to pay the basic charge or the predetermined portion of the charge for each employee. Accordingly, the company wants a new method for calculating the exact charge for business of each employee.

SUMMARY OF THE INVENTION

The present invention is intended to overcome the above-mentioned disadvantages of the conventional billing system. Therefore, it is an object of the present invention to provide a divisional billing method and device, by which the communication carrier may divide the mobile communication charges into the working purpose charges and the individual charges and then charge the working purpose charges and the individual charges for the divisional-payment company and the subscriber, respectively.

It is another object of the present invention to provide the divisional billing method and device, by which the communication carrier may divide call detail records by call and charge the mobile communication charges for the divisional-payment company and the subscribers.

It is still another object of the present invention to provide the divisional billing method and device, by which there are various divisional-payment methods for dividing the mobile communication charges into the working purpose charges and the individual charges.

To achieve these objects, one aspect of the present invention is a method for dividing a charge for using telecommunication service in a certain period into two portions and billing each portion of a charge to a divisional-payment subscriber and a divisional-payment company respectively, said method comprising the steps of extracting call detail record (CDR) in a predetermined period corresponding to each divisional-payment subscriber, calculating the charge corresponding to each divisional-payment subscriber's usage in a first portion of the charge for charging to the divisional-payment subscriber and a second portion of the charge for charging to the divisional-payment company, by using the CDR and divisional-payment criteria registered in advance and calculating a total charge of divisional-payment subscribers engaged in the divisional-payment company by summing up the second portion of charge corresponding to each subscriber.

Moreover, the method further comprises the step of extracting at least one divisional-payment subscriber registered in advance from a plurality of subscribers. Also, the step of extracting at least one divisional-payment subscriber registered in advance from a plurality of subscribers comprises the step of determining whether each subscriber is the divisional-payment subscriber or not by using subscriber's information corresponding to each subscriber stored in advance, and the subscriber's information is used for issuing a bill to each subscriber. Also, the step of calculating the charge corresponding to each divisional-payment subscriber's usage in a first portion of the charge for charging to the divisional-payment subscriber and a second portion of the charge for charging to the divisional-payment company, by using the CDR and divisional-payment criteria registered in advance, comprises the steps of dividing the CDR into a first CDR and a second CDR by using the divisional-payment criteria, calculating the first portion of the charge corresponding with at least one divisional-payment subscriber by using the first CDR, calculating the second portion of the charge corresponding with at least one divisional-payment subscriber by using the second CDR and storing the calculated first portion of the charge and second portion of the charge in a billing information database related to issuing bills to each divisional-payment subscriber. The method further comprises the step of making a personal-use bill corresponding with the first portion of the charge of at least one divisional-payment subscriber and a divisional-payment subscriber-use bill corresponding with at least one divisional-payment company. Also, the divisional-payment criteria that is basic data for dividing the charge of the divisional-payment subscribers into the first portion of the charge and the second portion of the charge, comprises at least one selected from the group consisting of basic information for classifying the CDR of the divisional-payment subscriber, a basic rate for dividing the charge of the divisional-payment subscriber into predetermined rate, and a basic amount for dividing the amount of the charge into a predetermined amount and the remaining amount. Also, the basic information for classifying the CDR of the divisional-payment subscriber, comprises at least one selected from the group consisting of a reserved time slot, reserved phone numbers, identification numbers reserved in advance and call type information. Also, the reserved time slot is calculated by using a start time for working and an end time for working. Also, the divisional-payment criteria registered in advance are settled by at least one between the divisional-payment subscribers or the divisional-payment companies. Also, the divisional-payment company comprises at least one selected from the group consisting of a corporation, a branch office and an agent corresponding with at least one divisional-payment subscriber. Also, the personal-use bill is delivered to the divisional-payment subscriber's address, and the divisional-payment subscriber-use bill is delivered to the divisional-payment company's address.

Another aspect of the present invention is an apparatus for dividing a charge for using telecommunication service in a certain period into two portions and billing each portion of the charge into a divisional-payment subscriber and a divisional-payment company respectively, said apparatus comprising means for extracting at least one divisional-payment subscriber from a plurality of subscribers, means for extracting call detail record(CDR) in a predetermined period corresponding to each divisional-payment subscriber, means for dividing the CDR into a first CDR and a second CDR by using the divisional-payment criteria, by using the CDR and divisional-payment criteria registered in advance, means for calculating the first portion of the charge corresponding with at least one divisional-payment subscriber by using the first CDR, means for calculating the second portion of the charge corresponding with at least one divisional-payment subscriber by using the second CDR, means for storing the calculated first portion of the charge and second portion of the charge, means for calculating a total charge of divisional-payment subscribers engaged in the divisional-payment company by summing up the second portion of charge corresponding to each subscriber and means for making a personal-use bill corresponding with the first portion of the charge of at least one divisional-payment subscriber and a divisional-payment subscriber-use bill corresponding with at least one divisional-payment company.

Still another aspect of the present invention is a system for dividing a charge for using telecommunication service in a certain period into two portions and billing each portion of a charge to a divisional-payment subscriber and a divisional-payment company respectively, said system comprising, a storage device and a processor coupled to said storage device, said storage device storing a program for controlling said processor, and said processor operative with said program to extract at least one divisional-payment subscriber from a plurality of subscribers, extract call detail record (CDR) in a predetermined period corresponding to each divisional-payment subscriber, divide the CDR into a first CDR and a second CDR by using the divisional-payment criteria, by using the CDR and divisional-payment criteria registered in advance, calculate the first portion of the charge corresponding with at least one divisional-payment subscriber by using the first CDR, calculate the second portion of the charge corresponding with at least one divisional-payment subscriber by using the second CDR, store the calculated first portion of the charge and second portion of the charge, calculate a total charge of divisional-payment subscribers engaged in the divisional-payment company by summing up the second portion of charge corresponding to each subscriber and make a personal-use bill corresponding with the first portion of the charge of at least one divisional-payment subscriber and a divisional-payment subscriber-use bill corresponding with at least one divisional-payment company.

BRIEF DESCRIPTION OF THE DRAWINGS

FIG. 5 is an illustration for illustrating a billing information database for divisional-payment service in accordance with one preferred embodiment of the present invention;

FIG. 6 is an illustration for illustrating a divisional-payment information database for divisional-payment service in accordance with another preferred embodiment of the present invention;

FIG. 7 is an illustration for illustrating a settling record database for calculating the mobile communication charges by the subscriber and the divisional-payment company in accordance with another preferred embodiment of the present invention;

FIG. 8 is an illustration for illustrating a charging record database for calculating the mobile communication charges by the subscriber and the divisional-payment company in accordance with another preferred embodiment of the present invention;

FIG. 9 is an illustration for illustrating a receipt record database for calculating the mobile communication charges by the subscriber and the divisional-payment company in accordance with another preferred embodiment of the present invention;

FIGS. 11–12 are illustrations for illustrating the divisional-payment procedure of the mobile communication charges in accordance with one preferred embodiment of the present invention;

FIG. 13 is an illustration for illustrating the divisional-payment procedure in accordance with another preferred embodiment of the present invention.

DETAILED DESCRIPTION OF THE INVENTION

Figure 1:
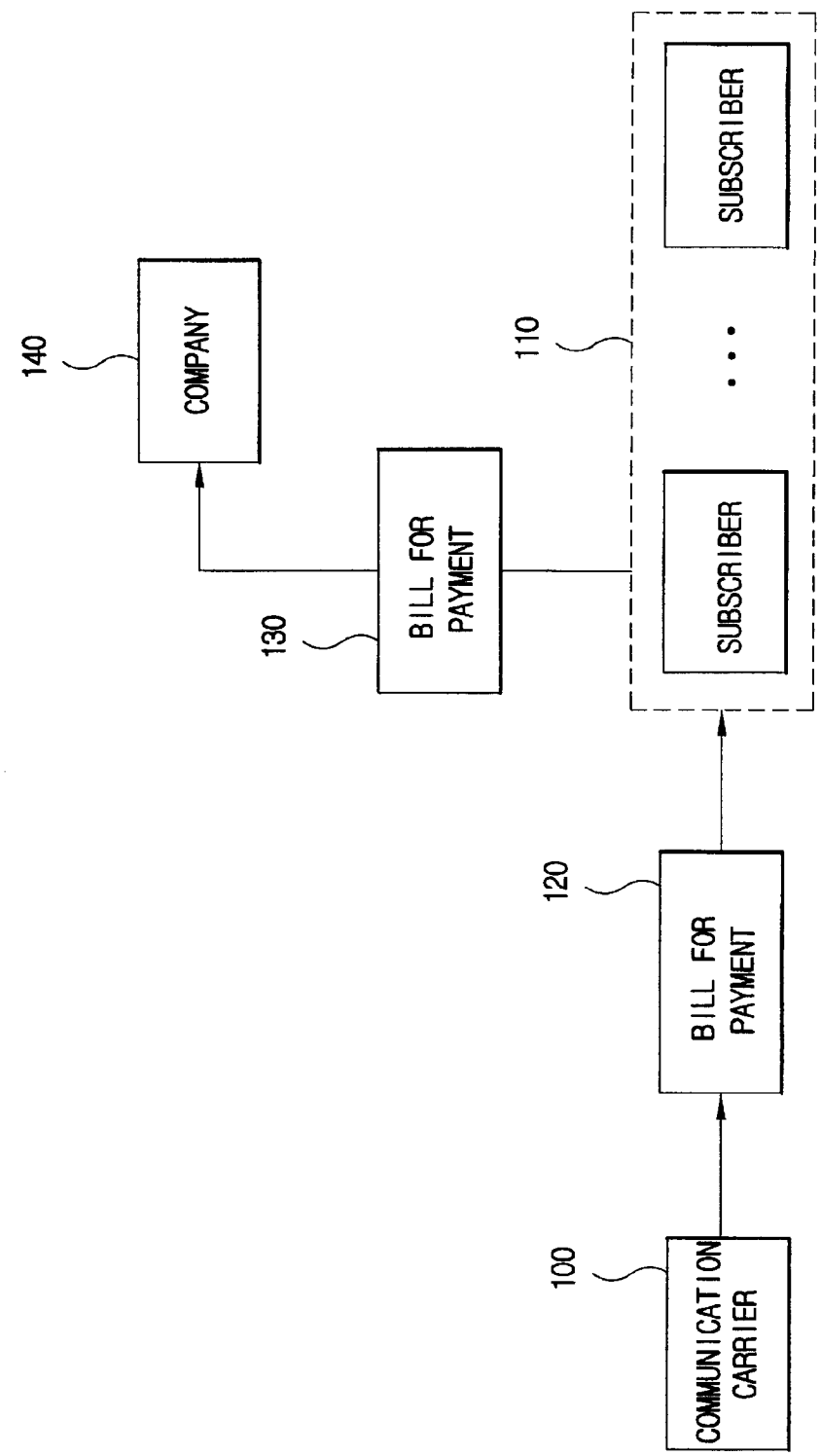
FIG. 1 shows the conventional procedure of divisional billing charge.

Prior to describing preferred embodiment of the present invention, contents related to the present invention will follow.

Communication service companies collect call detail records of their subscribers in predetermined period, in order to bill the charges for communication services. They analyze the collected records by call, and calculate the fee for communication services by summarizing the fee by each call or by applying a calculated total call time to predetermined price list.

In detail, a plurality of call data, that is raw data for calculating users' fee for communication service, comprises a start time for calling, an end time for calling, an opponent's phone numbers, and a feature code. The feature code comprises detailed information of provided communication services, for example, whether the time of connecting the call is in a regular charge application time slot or a discount charge application time slot, whether the call is a regular voice telephonic communication or '700' voice information service usage call, and whether the call is voice, data or SMS.

The services provided by using the feature code comprise 1) a service applied discount charge to telephonic communications with pre-registered numbers, 2) a service applied discount charge to telephonic communications with discount charge application time slot, and 3) a service applied discount charge to telephonic communications by virtual private networks(VPNs). The VPN service is an intelligent service. The VPN service endows members belonging to a predetermined group with an identification number (i.e., extension number) like virtual networks and requires members to communicate with their identification numbers. Regarding number "3)" service above, the feature code tells that the call is for telephonic communication by using the VPN service. Telephonic communication charges corresponding with calls by using the VPN services are divided from total telephonic communication charges. Accordingly, the telephonic communication charges may be divided and calculated by using the feature codes comprised in the call data. Also, the divided/calculated telephonic communication charges corresponding with the feature codes are charged to a plurality of targets. When these are applied to ordinary companies, the companies pay for the telephonic communication charges corresponding to the identification numbers, and members of staff pay for the telephonic communication charges corresponding to others numbers.

Accordingly, hereinafter two embodiments are described together. The first embodiment is that the telephonic communication charges are divided/calculated by using the feature codes as the telephonic communications by VPN or the telephonic communications by the '700' voice information service and are charges to a plurality of targets registered in advance. The second embodiment is that the telephonic communication charges are divided/calculated by using the divisional-payment information registered in advance except for the regular feature codes and are charges to a plurality of targets. In particular, the first embodiment can be applied to existing billing systems without serious modifications. Accordingly, the second embodiment will be mainly described hereinafter.

Hereinafter, preferred embodiments applied to the mobile communication carriers will be described in more detail with reference to the accompanying drawings, but it is understood that the present invention should not be limited to the following embodiments.

Figure 2:
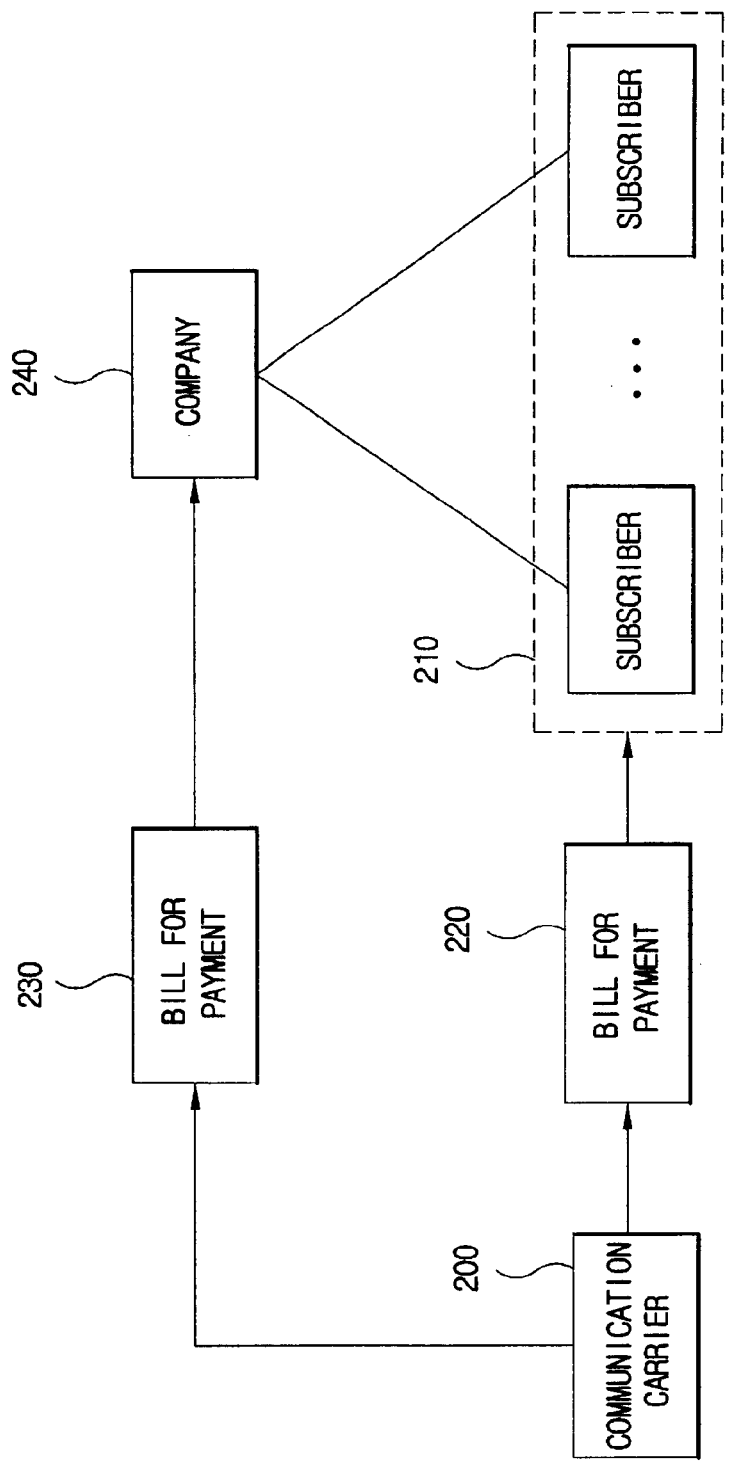
FIG. 2 is a schematic illustration for illustrating sending procedure of bill for mobile communication charges divided in accordance with one preferred embodiment of the present invention.

FIG. 2 is a schematic illustration for illustrating the sending procedure of bill for mobile communication charges divided in accordance with one preferred embodiment of the present invention.

Referring to FIG. 2, a communication carrier 200 calculates mobile communication charges of subscribers 210 periodically, and sends bills 220 for mobile communication charges of each subscriber (hereinafter, referred to as bill for individual payment) to the subscribers 210. In this case, when the subscribers 210 are members of the divisional-payment service, the mobile communication charges charged to the subscribers 210 are total mobile communication charges during a predetermined period except mobile communication charges for working purpose (hereinafter, referred to working purpose charges). The working purpose charge, individual charges and the total charges may be expressed on the bill for individual payment 220. The subscribers 210 may receive the bill for individual payment 220, and pay the total charges expressed on the bill for individual payment 220.

Also, the communication carrier 200 calculates the working purpose charges of the subscribers 210, and sends bill for mobile communication charge 230 (hereinafter, referred to as bill for divisional-payment subscriber charges) on which summarized amount of the working charges of subscribers of same company is expressed to the company 240 (hereinafter, referred to as divisional-payment company). In this case, the divisional-payment company 240 is not restricted to singular number or corporation. For example, when a head office pays for basic fee of mobile communication charge (or fee) and a branch office or an agent pays for working purpose charge (or fee), the divisional-payment company may be plural. Also, when a personal businessman pays for working purpose of his/her staff, the divisional-payment company may be a private person.

Working purpose charge records and total charges of the plurality of subscribers 210 belonging to the divisional-payment company 240 may be expressed on the bill for divisional-payment subscriber charges 230. The divisional-payment company 240 may receive the bill for divisional-payment subscriber charges 230, and pay the total charges expressed on the bill for divisional-payment subscriber charges 230 to the communication carrier 200.

Figure 3:
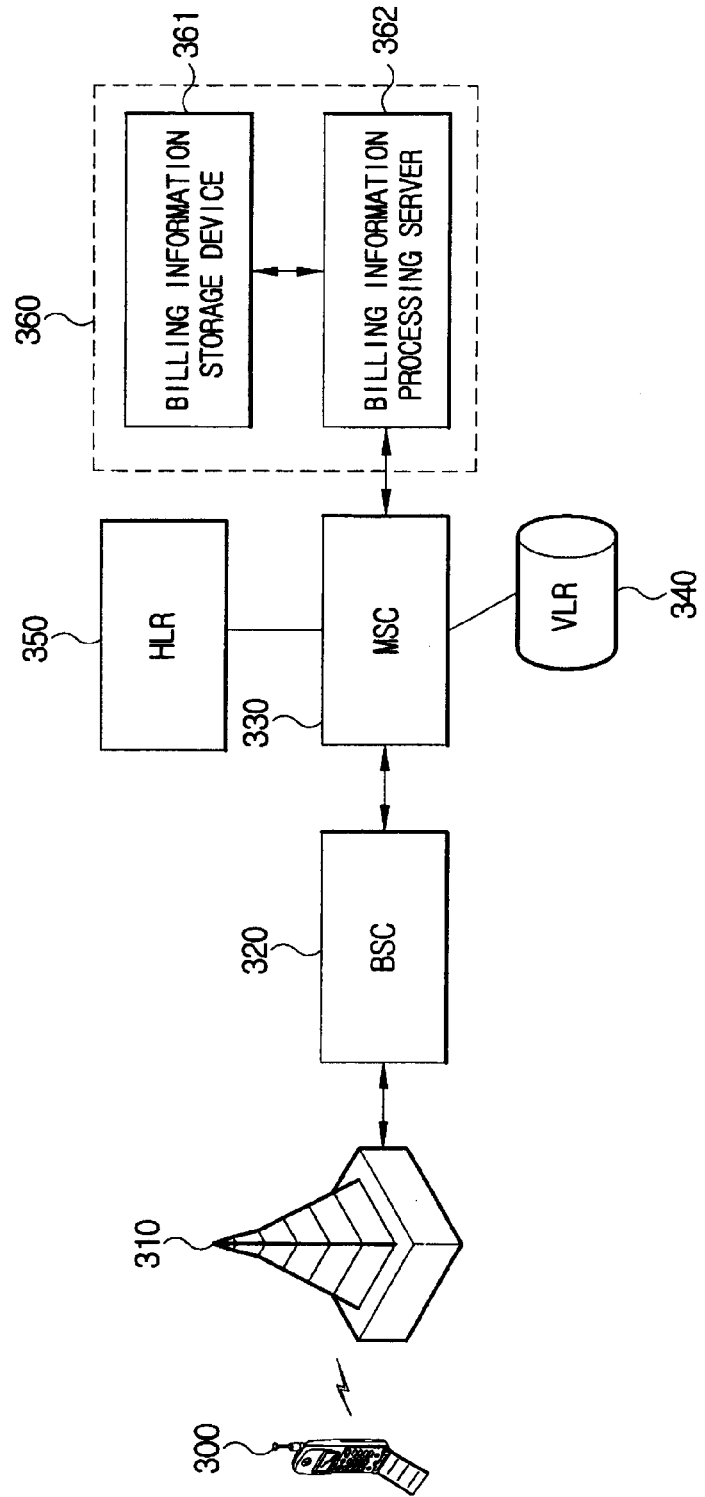
FIG. 3 is a schematic block diagram for illustrating a wireless communication system of a mobile communication terminal in accordance with one preferred embodiment of the present invention.

FIG. 3 is a schematic block diagram for illustrating a wireless communication system of a mobile communication terminal in accordance with one preferred embodiment of the present invention.

Referring to FIG. 3, a system in accordance with one preferred embodiment of the present invention comprises a mobile communication terminal 300 for communicating freely, a base transceiver station (BTS) 310 for providing mobile communication services by the mobile communication terminal, a base station controller (BCS) 320 for managing the BTS 310, a mobile switching center (MSC) 330 for connecting the BCS 320 to a public switched telephone network (PSTN) or other BTS, and a charging center (CC) 360 for calculating and charging the telephonic charges of the mobile communication terminal 300 coupled with the MSC 330.

The BTS 310 provides mobile communication services for subscribers by using the mobile communication terminal 300.

The BSC 320 controls data transmission between the BTS 310 and the MSC 330 and supports a plurality of BTS 310.

The MSC 330 connects to the BSC 320 and performs the function of call setting up and removal with the mobile communication terminal 300. The MSC 330 obtains the information of additional services or billing of the mobile communication terminal subscribers from the home location register (HLR) 350 and the visitor location register (VLR) 340.

The VRL 340 stores initial information of the mobile communication terminal subscriber and the mobile communication terminal 300 by registering its location in the VRL 340. The VRL 340 may be physically located at or apart from the MSC 330.

The HLR 350 stores permanent information and location information of the mobile communication terminal subscriber and the mobile communication terminal 300 and performs the call processes and additional service related functions.

The CC 360 is connected to the MSC 330 and receives billing related information just as the terminal number of the receiver and calling time, from starting time of call process of the mobile communication terminal 300, via communication networks. The CC 360 renews the billing information by using the received information and calculates the charges.

When a mobile communication subscriber inputs terminal number of receiving terminal and presses the 'send' button by using the mobile communication terminal 300, the call signal of the mobile communication terminal 300 is transmitted to the MSC 330 via the BTS 310 and the BSC 320. The MSC 330 analyzes the call signal and transmits it to the receiving mobile communication MSC 330.

When the receiving terminal replies to the phasing, the MSC 330 makes the mobile communication terminal 300 to communicate with the receiving terminal. The sending mobile communication MSC 330 transmits the billing related information just as the terminal number of the receiving terminal and calling time from starting time of call process to the CC 360 via communication networks. The CC 360 receives the billing related information from the MSC 330 of the mobile communication terminal subscriber and stores the billing related information in the billing information storage device 361.

In this case, the CC 360 operates the billing information processing server 362 for calculating the mobile telephonic charges of the mobile communication terminal for a predetermined period. The billing information processing server 362 divides charges by referring to call detail records, billing information and divisional-payment information of the subscriber 210, stored in the billing information storage device 361.

When the subscriber 210 is a divisional-payment subscriber, the CC 360 calculates the individual charges of the subscriber 210 and the divisional-payment subscriber charge of the divisional-payment company in accordance with the pre-registered feature codes of the mobile communication terminal subscriber. The bill for mobile communication charges in which the individual charges and the divisional-payment subscriber charge are expressed, is sent to the mobile communication terminal subscriber and the divisional-payment company.

Figure 4:
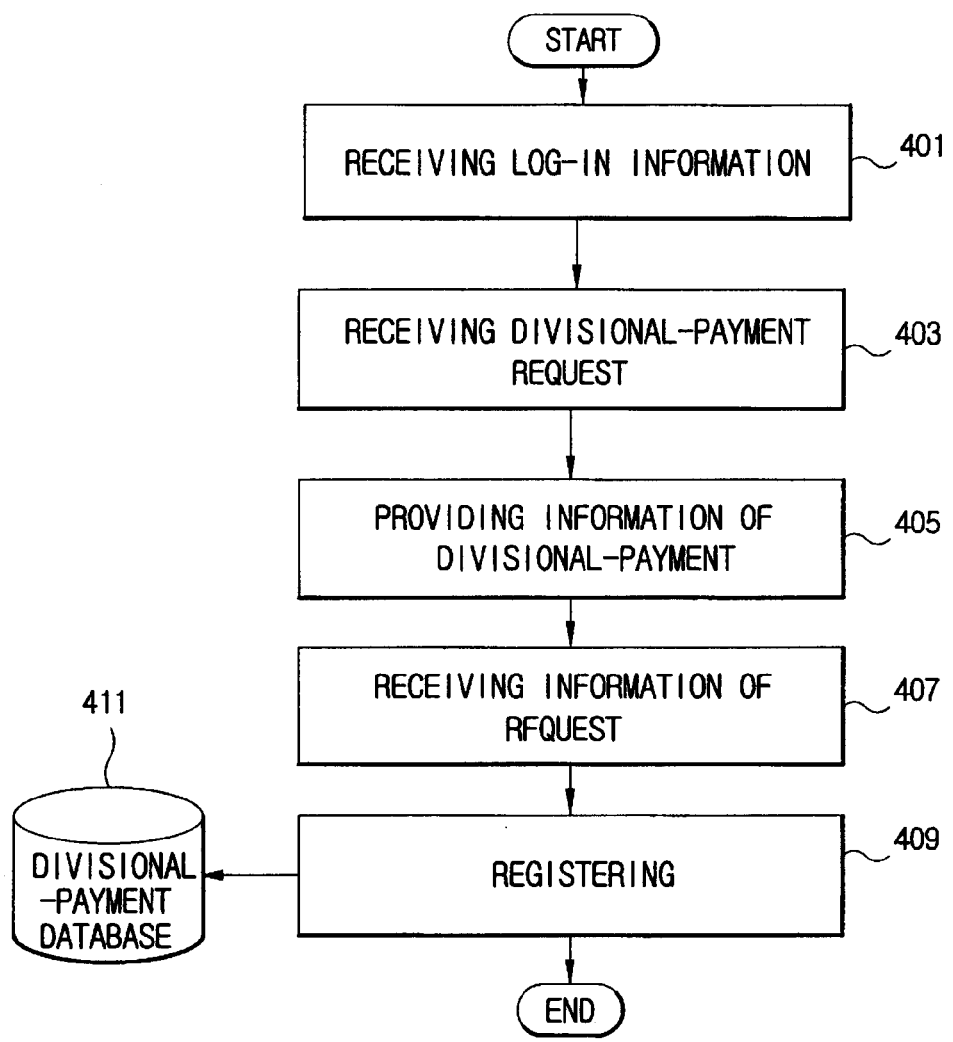
FIG. 4 is a flowchart for illustrating the divisional-payment request procedure of mobile communication usage via on-line in accordance with one preferred embodiment of the present invention.

FIG. 4 is a flowchart for illustrating the divisional-payment request procedure of mobile communication usage via on-line in accordance with one preferred embodiment of the present invention.

Referring to FIG. 4, at step 401, the communication carrier's server receives the log-in information of the mobile communication terminal subscriber and the divisional-payment company (hereinafter, commonly referred to as divisional-payment customer) from the mobile communication terminal or the on-line terminal (for example, Internet connectable PC) coupled with the communication carrier's server through the communication network.

The divisional-payment customer subscribes to the mobile communication carrier and connects to the mobile communication carrier's server to request or alter the divisional-payment service provided by the communication carrier.

The communication carrier's server determines whether the log-in information received from the terminal is valid or not. When the log-in information is not valid, the communication carrier's server transmits an error message to the divisional-payment customer or transmits a membership subscription page to the divisional-payment customer.

At step 403, the communication carrier's server receives the divisional-payment request from the divisional-payment customer authenticated at the above step.

At step 405, the communication carrier's server transmits a web page for the divisional-payment customer to input information of the divisional-payment corresponding with the divisional-payment request to the divisional-payment customer. The divisional-payment customer inputs the information of divisional-payment by using the web page and transmits it to the communication carrier's server (Step 407).

The communication carrier may provide three divisional-payment methods for the divisional-payment customer in accordance with preferred embodiment of the present invention. The first method is that the communication carrier divides the call detail records of the divisional-payment subscriber by a predetermined rule and charges the fee corresponding with the divided call detail records. The second method is that the communication carrier divides the telephonic charges by predetermined rate and charges the divided telephonic charges. Finally, the third method is that the communication carrier divides the telephonic charges into a predetermined amount of the telephonic charges and the rest of the telephonic charges. Regarding the second method, for example, the divisional-payment subscriber pays for 40% of the telephonic charges of the divisional-payment subscriber, and the divisional-payment company pays for the remaining 60% of the telephonic charges of the divisional-payment subscriber. Regarding the third method, for example, the divisional-payment company pays for the predetermined amount of the telephonic charges, just as the basic charges, and the divisional-payment subscriber pays for the rest of the telephonic charges.

The first method is divided into (a) divisional-payment method using a reserved time slot, (b) divisional-payment method using a reserved telephone number, (c) divisional-payment method using a pre-registered identification number, and (d) divisional-payment method using a feature code.

Regarding of the (a) divisional-payment method using a reserved time slot noted above, the communication carrier receives the reserved time slot from the divisional-payment subscriber, charges the mobile telephonic charges just as the working purpose charges, according to the usage of the divisional-payment subscriber in the reserved time slot to the divisional-payment company, and charges the mobile telephonic charges according to the usage of the divisional-payment subscriber except for the reserved time slot to the divisional-payment subscriber.

In the case of the (b) divisional-payment method using a reserved telephone number, the communication carrier receives the reserved telephone number from the divisional-payment customer, charges the mobile telephonic charges corresponding with the reserved telephone number to the divisional-payment company, and charges the mobile telephonic charges corresponding with the others except for the reserved telephonic number to the divisional-payment subscriber.

In the case of the (c) divisional-payment method using a pre-registered identification number, the communication carrier sets up the information of the pre-registered identification number in advance for dividing the working purpose charges of the mobile communication terminal subscriber. When the divisional-payment subscriber pushes the button or buttons corresponding with the pre-registered identification number and pushes the buttons corresponding with the receiver's telephone number, the communication carrier charges the mobile telephonic charges corresponding with the receiver's telephone number to the divisional-payment company. Namely, when the registered identification number is set up as '9' for working purpose and the divisional-payment subscriber pushes the button corresponding with the pre-registered identification number '9', and pushes the buttons corresponding with the receiver's telephone number, the communication carrier charges the mobile telephonic charges corresponding with the receiver's telephone number to the divisional-payment company.

In the case of the (d) divisional-payment method using a feature code, the communication carrier charges the mobile telephonic charges corresponding with pre-registered feature code to the divisional-payment company and charges the mobile telephonic charges corresponding with other feature codes to the divisional-payment subscriber. For example, when the divisional-payment subscriber is a working staff member of a company, the communication carrier charges the telephonic charges corresponding with the telephone call or data communication by using the VPN to the divisional-payment company, that is the company, and charges the telephonic charges corresponding with ordinary telephone call or '700' voice information service to the divisional-payment subscriber, that is the working staff member.

At step 409, the communication carrier's server stores the received information of the divisional-payment in the divisional-payment database and registers the mobile communication terminal subscriber as the divisional-payment subscriber.

When the communication carrier provides the divisional-payment services for the divisional-payment company and divisional-payment subscriber in accordance with one preferred embodiment of the present invention, databases for the divisional-payment services and fields comprised in the databases will be described hereinafter, referring to the FIGS. 5–9.

FIG. 5 is an illustration for illustrating a billing information database for divisional-payment service in accordance with one preferred embodiment of the present invention. Billing account information and divisional-payment information are comprised in the billing information database illustrated in the FIG. 5.

Referring to FIG. 5, the billing information database comprises a field of billing account 501, a field of consecutive numbers of bill 502, a field of customer numbers 503, a field of start date to calculate 504, a field of end date to calculate 505, a field of divisional-payment or not 506, a field of method of divisional-payment 507, a field of target of divisional-payment 508, a field of company code 509, a field of method of payment by company 510, a field of start time to work 511, a field of end time to work 512, a field of fixed payment method 513 and a field of rate of divisional-payment 514.

To describe the billing information database, sample data will be used. The sample data includes data of customers "A", "B" and "C".

The field of billing account 501 is a field related to billing account number corresponding with the current month's bill. The field of billing account 501 has unique value in a plurality of billing related databases. In the case of the sample data, the customer A's billing account is '21499', the customer B's billing account is '218707' and the customer C's billing account is '232100'.

The field of consecutive numbers of bill 502 is a field related to consecutive numbers of submitted bills up to the current date. In the case of the sample data, the customer A's consecutive number of bill is '3', the customer B's consecutive number of bill is '9' and the customer C's consecutive number of bill is '18'. Because the consecutive numbers of bills are settled at the time of initial submission of the bills and are increased at a predetermined value by every submission of the bills, the numbers of submissions of the bills to the customers may be recognized.

The field of customer number 503 is a field related to an identifier for discriminating subscribers. The field of number of customer 503 includes a subscriber number (a mobile terminal number) or a resident registration number. In the case of the sample data, the customer A's customer number is '000-000-0000', the customer B's customer number is '111-111-1111' and the customer C's customer number is '222-222-2222'.

The field of start date to calculate 504 is a field related to a start date of a predetermined period for calculating the telephonic charges. In the case of the sample data, the start date to calculate the customer A is Feb. 20, 2001, the start date to calculate the customer B is Feb. 11, 2001, and the start date to calculate the customer C is Mar. 01, 2001.

The field of end date to calculate 505 is a field related to an end date of a predetermined period for calculating the telephonic charges. In the case of the sample data, the start date to calculate the customer A is Mar. 20, 2001, the start date to calculate the customer B is Mar. 11, 2001, and the start date to calculate the customer C is Apr. 01, 2001.

The field of divisional-payment or not 506 is a field related to divisional-payment or not of the subscriber. When the subscriber requests the divisional-payment service, the value of the field 506 is 'Y'. When the subscriber does not request the service, the value of the field 506 is 'N'. In the case of the sample data, the value of the field 506 corresponding with the customer A, B, and C is 'Y'.

The field of method of divisional-payment 507 is a field related to the divisional-payment method requested by the subscriber. The value of the field 507 may be 'T' (method of time slot), or 'A' (method of fixed sum) corresponding with the divisional-payment method requested by the subscriber. In the case of the sample data, the value of the field 507 corresponding with the customer A is 'T', and the value of the field 507 corresponding with the customer B and C is 'A'.

The field of target of divisional-payment 508 is a field related to a target of divisional-payment requested by the subscriber. The value of the field 508 may be 'C' (company) or 'M' (private person). In the case of the sample data, the value of the field 508 corresponding with the customer A, B and C is 'C'.

The field of company code 509 is a field related to a company as the divisional-payment company. The company code is a unique value for discriminating other companies. In the case of the sample data, the company code corresponding with the customers A, B and C is '178452'. Namely, the customers A, B and C are working staff members of the same company.

The field of method of payment by company 510 is a field related to payment method by the divisional-payment company. The value of the field 510 may be 'C' (credit card), 'D' (pass-through), 'R' (Giro). In the case of the sample data, the method of payment by the divisional-payment company corresponding with the customers A, B and C is 'D'. To apply the method "D", the billing information database may further comprise a field of bank code or a field of bank account number in accordance with another preferred embodiment of the present invention.

The field of start time to work 511 is a field related to a start time of working. The field 511 is needed only when the value of the field of the method of divisional-payment 507 is 'T'. In the case of the sample data, the start time corresponding with the customer A is '09:00'. The value of the field 511 corresponding with the customers B and C is 'NULL'.

The field of end time to work 512 is a field related to an end time of working. The field 512 is needed only when the value of the field of the method of divisional-payment 507 is 'T'. In the case of the sample data, the start time corresponding with the customer A is '18:00'. The value of the field 512 corresponding with the customers B and C is 'NULL'.

The field of fixed payment method 513 is a field related to method of fixed payment. The value of the field 513 may be 'B' (basic charges) or 'R' (rated charges). When the fixed payment method is 'B', the divisional-payment charges are the basic charges of the subscriber. Also, when the fixed payment method is 'R', the divisional-payment charges are predetermined rate of the telephonic charges of the subscriber. In the case of the sample data, the fixed payment method of the customer B is 'B' and the fixed payment method of the customer C is 'R'. Also, the value of the field 513 corresponding with the customer A is 'NULL'.

The field of rate of divisional-payment 514 is a field related to rates of the fixed payment method, when the fixed payment method is 'R'. In the case of the sample data, the rate of the fixed payment method corresponding with the customer C is '50%'. Also, the value of the field 514 corresponding with the customers A and B is 'NULL'.

The billing information database may further comprise fields in accordance with still another preferred embodiment of the present invention. The billing account information and divisional-payment information are comprised in the billing information database.

FIG. 6 is an illustration for illustrating a divisional-payment information database for divisional-payment service in accordance with another preferred embodiment of the present invention.

Referring to FIG. 6, the billing information database and the divisional-payment database are constructed separately. Because the fields in the billing information database and the divisional-payment database are equal to the fields illustrated in FIG. 5, descriptions of them will be omitted hereinafter.

The billing information database may be constructed by adding a field of divisional-payment or not 606 on the existing billing information database. The communication carrier's server may read the divisional-payment information of the subscriber by referring to the divisional-payment database, when the value of the field of divisional-payment or not 606 is 'Y'. In the case of the sample data, the value of the field 606 corresponding with the customers A, B and C is 'Y'. Accordingly, the communication carrier's server may calculate the mobile communication charges divisionally by referring to the divisional-payment database.

FIG. 7 is an illustration for illustrating a settling record database for calculating the mobile communication charges by the subscriber and the divisional-payment company in accordance with another preferred embodiment of the present invention.

Referring to FIG. 7, the settling record database comprises a field of billing account 701, a field of consecutive numbers of settlement 702, a field of settlement classification 703, a field of occurrence date of settlement 704, a field of settlement amount 705, a field of consecutive numbers of bill reflected settlement 706, and a field of settling target 707.

The field of consecutive numbers of settlement 702 is a field related to a unique consecutive number for discriminating other settlements in the same billing account.

The value of the field of settlement classification 703 may be 'settlement' or 'settlement cancellation'.

The field of occurrence date of settlement 704 is a field related to the occurrence date of settling or settling cancellation.

The field of settlement amount 705 is a field related to the amount to settle or settlement cancellation.

The field of consecutive numbers of bill reflected settlement 706 is a field related to the consecutive numbers of the target reflected settlement or settlement cancellation.

The field of settling target 707 is a field related to targets reflected settlement or settlement cancellation. The value of the field of settling target 707 may be 'basic charges', 'monthly fixed charges', 'entrance fee', 'cost of the terminal', or 'telephonic charges'.

FIG. 8 is an illustration for illustrating a charging record database for calculating the mobile communication charges by the subscriber and the divisional-payment company in accordance with another preferred embodiment of the present invention.

Referring to FIG. 8, the charging record database comprises a field of billing account 801, a field of consecutive numbers of bill 802, a field of date of transaction bill 803, a field of date of submitting bill 804, a field of date of payment 805, a field of charging amount of the last month 806, a field of receipt amount of the last month 807, a field of increasing amount of the last month 808, a field of settling amount of the last month bill 809, a field of nonpayment amount of the last month 810, a field of nonpayment amount of arrears target 811, a field of total charging amount 812, and a field of payment method 813.

The field of date of transaction bill 803 is a field related to a date of transaction.

The field of date of submitting bill 804 is a field related to a date of submitting bill.

The field of date of payment 805 is a field related to a closing date of the bill.

The field of charging amount of the last month 806 is related to a field related to total charging amount of money for the last month. The charging amount of the last month has positive value or negative value.

The field of receipt amount of the last month 807 is a field related to receipt amount of money until the date of charging.

The field of settling amount of the last month bill 809 is a field related to charging amount via on-line and to receipt amount via on-line.

The field of nonpayment amount of the last month 810 is a field related to total nonpayment amount expiring on the closing day of payment of the last month. The nonpayment amount of the last month has positive value or negative value.

The field of nonpayment amount of arrears target 811 is a field related to nonpayment amount imposed with additional charges out of the nonpayment amount of the last month.

The field of total charging amount 812 is a field related to the total charging amount of money of the current month by the customers or the billing accounts.

The field of payment method 813 is a field related to the payment methods.

FIG. 9 is an illustration for illustrating a receipt record database for calculating the mobile communication charges by the subscriber and the divisional-payment company in accordance with another preferred embodiment of the present invention.

Referring to FIG. 9, the receipt record database comprises a field of billing account 901, a field of consecutive numbers of receipting 902, a field of date of transactions of receipting 903, a field of bank code 904, a field of receipting method 905, a field of detailed receipting method 906, a field of credit card numbers 907, a field of card admission numbers 908, a field of actual payment amount by customer 909, and a field of membership numbers 910.

The field of consecutive numbers of receipting 902 is a field related to a unique identifier for identifying receipting by billing accounts.

The field of date of transactions of receipting 903 is a field related to a date of customer's actual receipting for charging fee.

The field of receipting method field 905 is a field related to subscriber's receipting method for charging fee. The value of the field 905 may be 'credit card', 'cash', or 'pass-through'.

Figure 10:
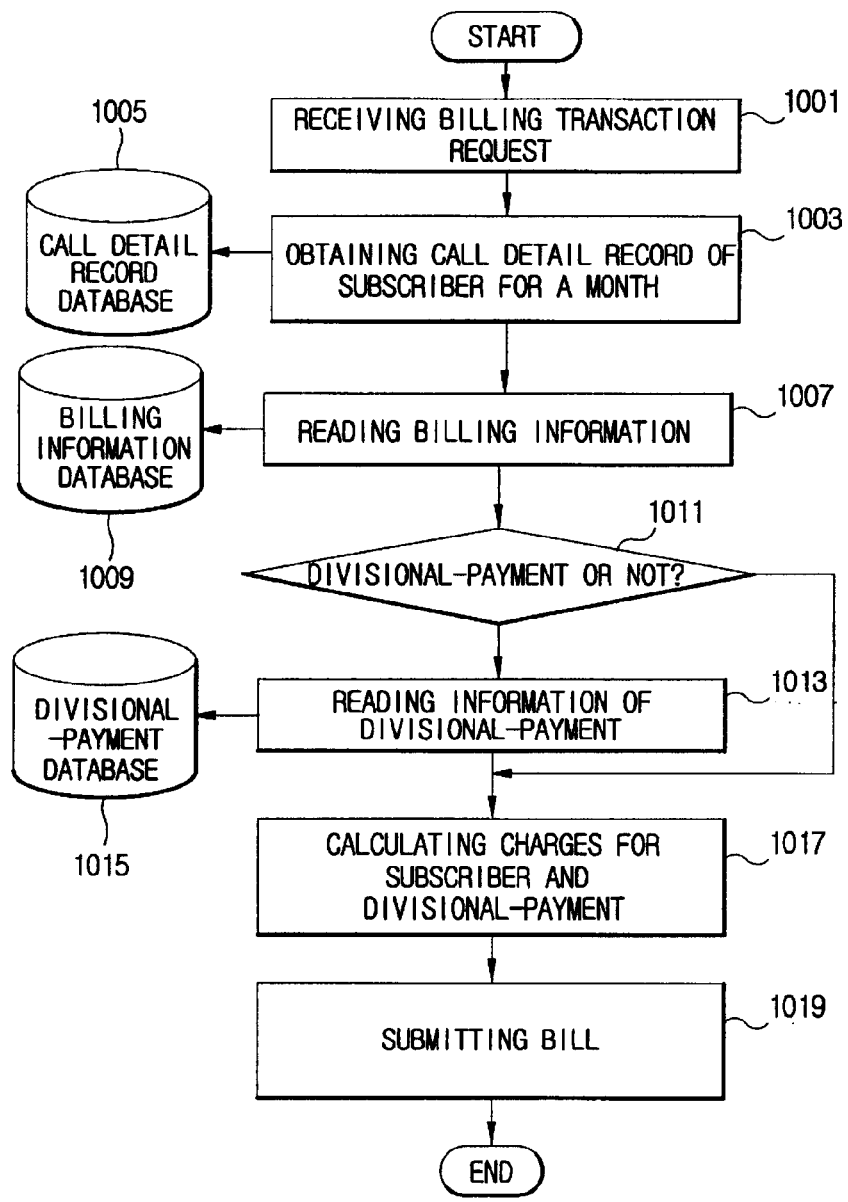
FIG. 10 is a flowchart for illustrating a calculating procedure of mobile communication charges of the subscriber in accordance with one preferred embodiment of the present invention.

FIG. 10 is a flowchart for illustrating a calculating procedure of mobile communication charges of the subscriber in accordance with one preferred embodiment of the present invention. In this embodiment, the billing information database and the divisional-payment database are separate as illustrated in FIG. 6.

Referring to FIG. 10, at step 1001, the billing information transaction server receives a billing transaction request for calculating the mobile communication charges of the subscribers periodically from the subscribers.

The billing information transaction server transacts billing process from Apr. 01, 2001, for charging the mobile communication charges of the subscribers from Mar. 01, 2001 to Mar. 31, 2001. When the period of billing is from Apr. 06, 2001 to Apr. 10, 2001, all bills for subscribers are made during that period. To make all bills for the subscribers during that period, the billing information transaction server calculates the mobile communication charges of the subscribers from Mar. 01, 2001 to Mar. 31, 2001. Accordingly, the billing information transaction server receives the billing transaction request periodically.

At step 1003, the billing information transaction server obtains the call detail records of the subscribers during a predetermined period by referring to the call detail record database 1005, for calculating the mobile communication charges of the subscribers.

At step 1007, the billing information transaction server reads the billing information of the subscribers from the billing information database 1009, for calculating the mobile communication charges of the subscribers based on the call detail records. The billing information of the subscribers comprises a charging system requested from the subscribers and required information for calculating charges.

At step 1011, the billing information transaction server determines whether the subscriber is a member of divisional-payment service or not based on the billing information obtained at step 1007. When the subscriber is a member of the divisional-payment service, the billing information transaction server performs the step 1013, and obtains the divisional-payment information of the subscriber. When the subscriber is not a member of the divisional-payment service, the billing information transaction server performs the step 1017.

At step 1017, the billing information transaction server calculates the mobile communication charges of the subscriber and the divisional-payment company based on the divisional-payment information of the subscriber. The step 1017 performed by the billing information transaction server comprises the steps of discriminating the individual call detail records and the working purpose call detail records for the subscriber and calculating the individual charges and the working purpose charges by applying pre-registered charging system to the discriminated call detail records. The step of calculating the individual charges and the working purpose charges discriminately may be altered by the divisional-payment method, just as the calculation rule of the individual charges and the working purpose charges.

At step 1017, by said first divisional-payment method, the billing information transaction server divides the call detail records of the subscriber into call detail records corresponding with the reserved time slot of working hours of the subscriber and call detail records corresponding with the others except for the reserved time slot. The billing information transaction server calculates the working purpose charges and the individual charges by applying pre-registered charging system based on the divided call detail records. By said second divisional-payment method, the billing information transaction server divides the call detail records of the subscriber into call detail records corresponding with the reserved telephone number and call detail records except for the reserve telephone number. The billing information transaction server calculates the working purpose charges and the individual charges by applying pre-registered charging system. By said third divisional-payment method, the billing information transaction server divides the call detail records of the subscriber into call detail records corresponding with pre-registered identification number and call detail records corresponding with the others except for the pre-registered identification number. The billing information transaction server calculates the working purpose charges and the individual charges by applying pre-registered charging system based on the divided call detail records.

At step 1019, the billing information transaction server makes and submits the bill for mobile communication charges of the subscriber and the divisional-payment company based on the calculated working purpose charges and individual charges.

At steps 1017 and 1019, the billing information transaction server may calculate the mobile communication charges of the divisional-payment company, after calculating the working purpose charges and the individual charges of the subscribers in accordance with another preferred embodiment of the present invention. In this case, the mobile communication charges of the divisional-payment company are a sum of the working charges of the subscribers. The calculated mobile communication charges are expressed on the bill of the divisional-payment company and sent to it.

These embodiments may be applied to a combined system of the billing information database and the divisional-payment database in accordance with still another embodiment of the present invention.

Figure 11:
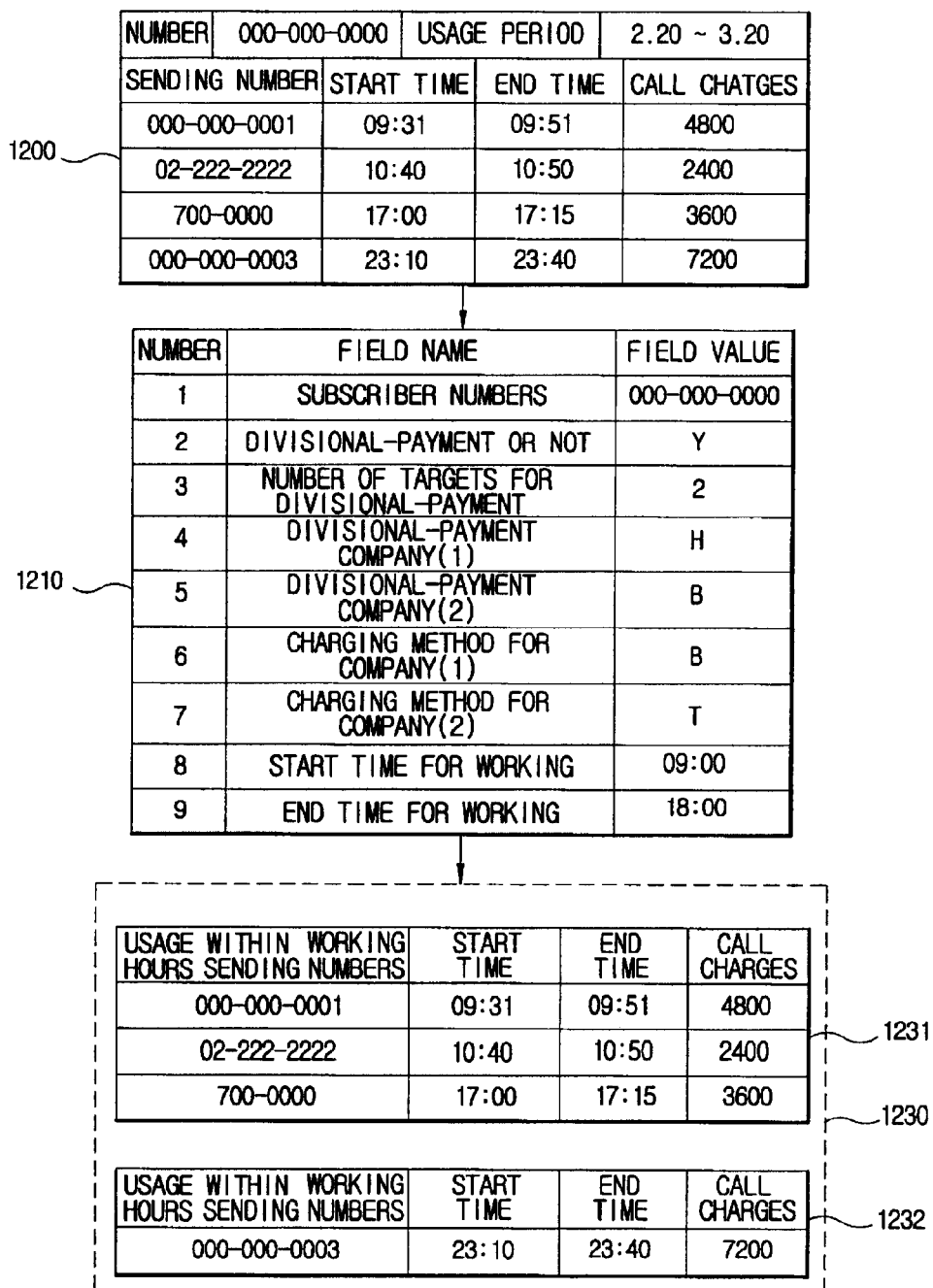

FIG. 11 and FIG. 12 are illustrations for illustrating the divisional-payment procedure of the mobile communication charges in accordance with one preferred embodiment of the present invention.

Referring to FIG. 11, for describing the divisional-payment procedure of the mobile communication charges in accordance with a preferred embodiment of the present invention, call detail records 1200 of customer A, a database 1210 storing the divisional-payment information of customer A, and divided call detail records 1230 are expressed. The divided call detail records 1230 comprise call detail records 1231 corresponding to usage within working hours of customer A and call detail records 1232 corresponding to usage after working hours of customer A divided by the divisional-payment information.

The call detail records 1200 of customer A may comprise a mobile communication terminal number, a usage period, sending numbers during the usage period, calling time in accordance with each sending number and call charges in accordance with each calling time. The mobile communication terminal number of customer A is '000-000-0000', and the usage period is from February 20 to March 20. Also, call charges are '4,800 won' for calling '000-000-0001' from 09:31 to 09:51 during the usage period, call charges are '2,400 won' for calling '02-222-2222' from 10:40 to 10:48, call charges are '3,600 won' for calling '700-0000' from 17:00 to 17:10, and call charges are '7,200 won' for calling '000-000-0002' from 23:10 to 23:40.

The divisional-payment information database 1210 of customer A may comprise a field of subscriber numbers, a field of divisional-payment or not, a field of numbers of targets for divisional-payment, a field of divisional-payment company, fields of divisional-payment method of the companies (1) and (2), a field of start time for working, and a field of end time for working.

The value of the field of subscriber numbers is '000-000-0000', and the mobile communication terminal number of the subscriber A. The value of the field of divisional-payment or not is 'Y', and represents that subscriber A is a divisional-payment service member. The value of numbers of targets for divisional-payment is '2', and represents that the mobile communication charges of customer A is charged to two divisional-payment targets. The values of the field of the divisional-payment company are 'H' corresponding with a head office and 'B' corresponding with a branch office. The value of the field of divisional-payment method of the company (1) is 'B', representing that the head office is charged for pre-determined amount of the mobile communication charges, just as basic charges of the subscriber. The value of the field of divisional-payment method of the company (2) is 'T', representing that the branch office is charged for working purpose charges within working hours of the mobile communication charges of the subscriber. The value of the field of start time for working is '09:00'. The value of the field of end time for working is '18:00'. The fields of start and end time for working, are related to the divisional-payment method of the branch office.

The call detail records of the subscriber are divided into call detail records corresponding with the usage within working hours and call detail records corresponding with the usage after working hours, based on the divisional-payment information stored in the divisional-payment information database 1210 of subscriber A.

The start time for working of the subscriber is '09:00', and the end time for working of the subscriber is '18:00'. The call detail records 1231 corresponding with the usage within working hours comprise a call record of calling '000-000-0001' from '09:31' to '09:51', a call record of calling '02-222-2222' from '10:40' to '10:50', and a call record of calling '700-0000' from '17:00' to '17:15'. The call detail records 1232 corresponding with the usage after working hours comprise a call record of calling '000-000-0003' from '23:10' to '23:40'.

The bills for the subscriber A, the branch office, and the head office are expressed in the FIG. 12, and made based on the divided call detail records.

Referring to FIG. 12, the bill 1221 for the mobile communication charges of the subscriber A comprises the bill 1222 for the mobile communication charges of the branch office and the bill 1223 for the mobile communication charges of the head office.

The bill 1221 for the mobile communication charges of the subscriber A comprises basic charges, charges for the usage after working hours, charges for the usage within working hours, and total charges. The charges for the usage within working hours, just like the working purpose charges, from '09:00' to '18:00' is '4,800 won+3,600 won+2,400 won=10,800 won'. The charges for the usage after working hours, just like the individual charges, for calling '000-000-0003' is '7,200 won'. Accordingly, the total charges for the subscriber A are the charges for the usage afterward working hours, '7,200 won'.

The bill 1222 for the mobile communication charges of the branch office comprises a branch office code, total charges, a working staff code, and charges of the working staff. The charges of the branch office for the mobile communication charges of the subscriber A are the charges for the usage within working hours, '10,800 won', in accordance with a pre-registered agreement. The branch may have no obligation for the charges for the usage within working hours and for the usage except for working purpose in accordance with another preferred embodiment of the present invention. Accordingly, the branch office may have no obligation for the charges for the call of '700 service', but have an obligation for the charges of the mobile communication charges of the subscriber A, '7,100 won'.

The bill 1223 for the mobile communication charges of the subscriber A comprises a head office code, total charges, working staff code, and charges of each working staff member. The charges of the head office for the mobile communication charges of the subscriber A may be altered based on pre-registered agreement. In the case of the sample data, the charges of the head office for the mobile communication charges of the subscriber are the basic charges, '10,000 won'.

FIG. 13 is an illustration for illustrating the divisional-payment procedure in accordance with another preferred embodiment of the present invention.

Referring to FIG. 13, call detail records 1301 of the subscriber A, call detail records 1302 of the subscriber B, call detail records 1303 of the subscriber C, bill 1311 for the mobile communication charges of the subscriber A, bill 1312 for the mobile communication charges of the subscriber B, bill 1313 for the mobile communication charges of the subscriber C, and bill 1314 for the mobile communication charges of the divisional-payment company are expressed in the FIG. 13.

The call detail records 1301, 1302, 1303 of the subscribers comprise each subscriber's mobile terminal number, usage periods, sending numbers during the usage period, calling times in accordance with each sending number and call charges in accordance with each calling time.

Referring to the call detail records 1301 of the subscriber A, the mobile communication terminal number of the customer A is '000-000-0000', and the usage period is from February 20 to February 28. Also, call charges are '4,800 won' for calling '000-000-0001' from 09:31 to 09:51 during the usage period, call charges are '3,600 won' for calling '063-444-4444' from 13:03 to 13:18, and call charges are '7,200 won' for calling '000-000-0002' from 23:10 to 23:40.

Referring to the call detail records 1302 of the subscriber B, the mobile communication terminal number of the customer B is '111-111-1111', and the usage period is from February 11 to February 28. Also, call charges are '4,800 won' for calling '111-11-111-111-1113' from 12:04 to 12:58 during the usage period, call charges are '4,800 won' for calling '02-111-1111' from 14:04 to 14:24, and call charges are '3,600 won' for calling '032-111-1111' from 19:33 to 20:31.

Referring to the call detail records 1303 of the subscriber C, the mobile communication terminal number of the customer C is '222-222-2222', and the usage period is from February 01 to February 28. Also, call charges are '4,800 won' for calling '700-0000' from 13:13 to 13:23 during the usage period, call charges are '2,400 won' for calling '222-222-2222' from 08:09 to 08:19, and call charges are '3,600 won' for calling '222-222-2223' from 20:21 to 20:36.

The billing information transaction server calculates each mobile communication charge by referring to the divisional-payment information database based on the call detail records by subscribers.

Referring to the bill 1311 for the mobile communication charges of the subscriber A, the basic charges are '10,000 won'. The charges for the usage after working hours for calling '000-000-0002' is '7,200 won'. The charges for the usage within working hours from '09:00' to '18:00' are '4,800 won+3,600 won=8,400 won'. According to the divisional-payment information of the subscriber A, the subscriber A has an obligation for the basic charges and the individual charges, and the divisional-payment company has an obligation for the working purpose charges. Accordingly, the total charges for the subscriber A are '17,200 won'.

Referring to the bill 1312 for the mobile communication charges of the subscriber B, the basic charges are '10,000 won'. The total charges of the subscriber B are '13,200 won'. According to the divisional-payment information of the subscriber B, the divisional-payment company has an obligation for the basic charges. Accordingly, the total charges for the subscriber B are '13,200 won'.

Referring to the bill 1313 for the mobile communication charges of the subscriber C, the basic charges are '10,800 won'. The total charges of the subscriber C are '10,000 won'. According to the divisional-payment information of the subscriber C, the divisional-payment company has an obligation for 50% of the total charges of the subscriber C. Accordingly, the total charges for the subscriber C are '10,400 won'.

Referring to the bill 1314 for the mobile communication charges of the divisional-payment company, the total charges comprise the working purpose charges of the subscribers. The divisional-payment company pays for the subscriber A for the charges within working hours, '8,400 won'. The divisional-payment company pays for the subscriber B for the basic charges, '10,000 won'. Also, the divisional-payment company pays for the subscriber C for 50% of the total charges, '10,400 won'. Accordingly, the total charges for the divisional-payment company are '8,400 won+10,000 won+10,400 won=28,800 won'.

Figure 14:
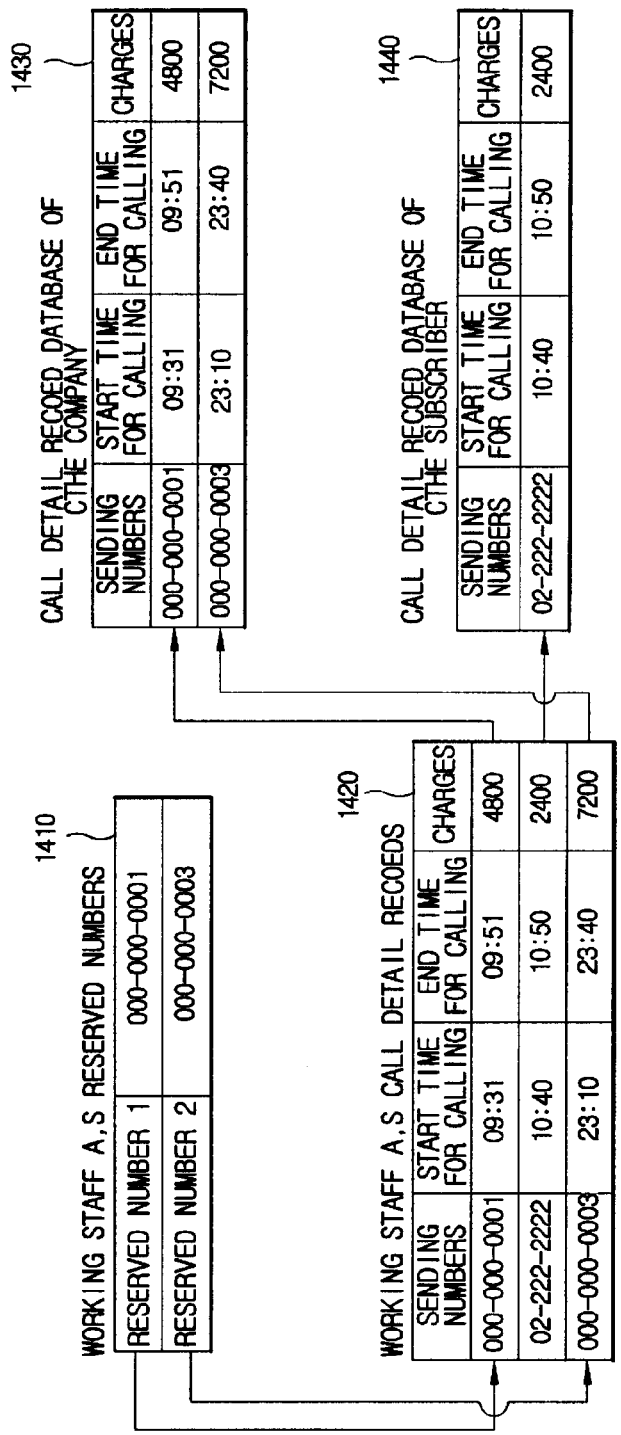
FIG. 14 is an illustration for illustrating the transaction procedure of the divisional-payment in accordance with another preferred embodiment of the present invention.

FIG. 14 is an illustration for illustrating the transaction procedure of the divisional-payment in accordance with another preferred embodiment of the present invention.

Referring to FIG. 14, reserved numbers 1410 that are reserved by the subscriber for working purpose to the communication carrier, call detail records 1420 during predetermined period by the subscriber, a call detail record database 1430 of the company for storing the call detail records in accordance with working purpose by the subscriber, and call detail record database 1440 of the subscriber for storing the call detail records in accordance with the others except for working purpose by the subscriber are expressed in the FIG. 14.

The communication carrier may charge for the telephonic charges for calling the reserved numbers by the subscriber, when the subscriber reserves telephone numbers for working purpose as the reserved numbers. Two divisional-payment methods are applied to the call in accordance with the reserved numbers. The first method is that the communication carrier divides the call detail records into the working purpose calls and the individual calls by using the reserved numbers for billing transaction. Also, the second method is that the communication carrier divides the call detail records into the working purpose calls and the individual calls by using the reserved numbers for storing the call detail records after calling, and stores the divided call detail records in the database.

In the case of the second method, the communication carrier stores the divisional-payment information, the information of the reserved numbers, in the MSC in advance. Then, the communication carrier stores the call detail records and the reserved numbers of the subscriber in the call detail record database 1430 of the company.

Namely, in the calculation procedure for the mobile communication charges, the dividing procedure that divides the working purpose call and the individual calls may not be needed, compared with the embodiment described referring to FIG. 11. Accordingly, when the subscriber terminates the call, the MSC determines whether the call is the working purpose call or the individual call, and stores the determined results in the call detail record database 1430 of the company or the call detail record database 1440 of the subscriber. The communication carrier may calculate the mobile communication charges according to each call detail record.

In the case of the sample data, the subscriber reserves the telephone numbers for working purpose as '000-000-0001' and '000-000-0003'. When the subscriber A calls '000-000-0001' from '09:31' to '09:51', the communication carrier determines whether the '000-000-0001' is comprised in the reserved numbers 1410 reserved by the subscriber A or not, at the time of ending the call. Because the '000-000-0001' is comprised in the reserved numbers 1410, the communication carrier stores the call detail record in the call detail record database 1430 of the company. When the subscriber A calls '02-222-2222' from '10:40' to '10:50', the communication carrier determines whether the '02-222-2222' is comprised in the reserved numbers 1410 reserved by the subscriber A or not, at the time of ending the call. Because the '02-222-2222' is not comprised in the reserved numbers 1410, the communication carrier stores the call detail record in the call detail record database 1440 of the subscriber A. When the subscriber A calls '000-000-0003' from '23:10' to '23:40', the communication carrier determines whether the '000-000-0003' is comprised in the reserved numbers 1410 reserved by the subscriber A or not at the time of ending the call. Because the '000-000-0003' is comprised in the reserved numbers 1410, the communication carrier stores the call detail record in the call detail record database 1430 of the company.

Accordingly, the communication carrier may calculate the mobile communication charges based on each call detail record database, according to the calculation request from the subscriber A and the company. The calculated bill for the individual charges is submitted to the subscriber A. Also, the calculated bill for the working purpose charges is submitted to the company.

Although the present invention has been described in terms of various embodiments, it is not intended that the invention be limited to these embodiments. Modification within the spirit of the invention will be apparent to those skilled in the art.

One advantage of the divisional billing and device in accordance with one preferred embodiment of the present invention is that the communication carrier may divide the mobile communication charges into the working purpose charges and the individual charges and charge the working purpose charges and the individual charges for the divisional-payment company and the subscriber, .respectively.

Another advantage of the divisional billing and device in accordance with one preferred embodiment of the present invention is that there are various divisional-payment methods for dividing the mobile communication charges into the working purpose charges and the individual charges.

We claim:

1. A method for dividing a charge for using telecommunication service in a certain period into two portions and billing each portion of a charge to a divisional-payment subscriber and a divisional-payment company respectively, said method comprising the steps of:

extracting call detail record(CDR) in a predetermined period corresponding to each divisional-payment subscriber;

calculating the charge corresponding to each divisional-payment subscriber's usage in a first portion of the charge for charging to the divisional-payment subscriber and a second portion of the charge for charging to the divisional-payment company, by using the CDR and divisional-payment criteria registered in advance; and calculating a total charge of divisional-payment subscribers engaged in the divisional-payment company by summing up the second portion of charge corresponding to each subscriber.

2. The method of claim 1, further comprising the step of extracting at least one divisional-payment subscriber registered in advance from a plurality of subscribers.

3. The method of claim 2, wherein the step of extracting at least one divisional-payment subscriber registered in advance from a plurality of subscribers comprises the step of determining whether each subscriber is the divisional-payment subscriber or not by using subscriber's information corresponding to each subscriber stored in advance, and the subscriber's information is used for issuing a bill to each subscriber.

4. The method of claim 1, wherein the step of calculating the charge corresponding to each divisional-payment subscriber's usage in a first portion of the charge for charging to the divisional-payment subscriber and a second portion of the charge for charging to the divisional-payment company, by using the CDR and divisional-payment criteria registered in advance, comprises the steps of:

dividing the CDR into a first CDR and a second CDR by using the divisional-payment criteria;

calculating the first portion of the charge corresponding with at least one divisional-payment subscriber by using the first CDR;

calculating the second portion of the charge corresponding with at least one divisional-payment subscriber by using the second CDR; and storing the calculated first portion of the charge and second portion of the charge in a billing information database related to issue bills to each divisional-payment subscriber.

5. The method of claim 1, further comprising the step of making a personal-use bill corresponding with the first portion of the charge of at least one divisional-payment subscriber and a divisional-payment subscriber-use bill corresponding with at least one divisional-payment company.

6. The method of claim 1, wherein the divisional-payment criteria that is basic data for dividing the charge of the divisional-payment subscribers into the first portion of the charge and the second portion of the charge, comprises at least one selected from the group consisting of basic information for classifying the CDR of the divisional-payment subscriber, a basic rate for dividing the charge of the divisional-payment subscriber into predetermined rate, and a basic amount for dividing the amount of the charge into a predetermined amount and the remaining amount.

7. The method of claim 6, wherein the basic information for classifying the CDR of the divisional-payment subscriber, comprises at least one selected from the group consisting of a reserved time slot, reserved phone numbers, identification numbers reserved in advance and call type information.

8. The method of claim 7, wherein the reserved time slot is calculated by using a start time for working and an end time for working.

9. The method of claim 1, wherein the divisional-payment criteria registered in advance are settled by at least one divisional-payment subscriber or the divisional-payment company.

10. The method of claim 1, wherein the divisional-payment company comprises at least one selected from the group consisting of a corporation, a branch office and an agent corresponding with at least one divisional-payment subscriber.

11. The method of claim 5, wherein the personal-use bill is delivered at the divisional-payment subscriber's address, and the divisional-payment subscriber-use bill is delivered at the divisional-payment company's address.

12. An apparatus for dividing a charge for using telecommunication service in a certain period into two portions and billing each portion of a charge to a divisional-payment subscriber and a divisional-payment company respectively, said apparatus comprising:

means for extracting at least one divisional-payment subscriber from a plurality of subscribers;

means for extracting call detail record(CDR) in a predetermined period corresponding to each divisional-payment subscriber;

means for dividing the CDR into a first CDR and a second CDR by using the divisional-payment criteria, by using the CDR and divisional-payment criteria registered in advance;

means for calculating the first portion of the charge corresponding with at least one divisional-payment subscriber by using the first CDR;

means for calculating the second portion of the charge corresponding with at least one divisional-payment subscriber by using the second CDR;

means for storing the calculated first portion of the charge and second portion of the charge;

means for calculating a total charge of divisional-payment subscribers engaged in the divisional-payment company by summing up the second portion of charge corresponding to each subscriber; and means for making a personal-use bill corresponding with the first portion of the charge of at least one divisional-payment subscriber and a divisional-payment subscriber-use bill corresponding with at least one divisional-payment company.

13. A system for dividing a charge for using telecommunication service in a certain period into two portions and billing each portion of a charge to a divisional-payment subscriber and a divisional-payment company respectively, said system comprising:

a storage device; and a processor coupled to said storage device, said storage device storing a program for controlling said processor; and said processor operative with said program to extract at least one divisional-payment subscriber from a plurality of subscribers;

extract call detail record(CDR) in a predetermined period corresponding to each divisional-payment subscriber;

divide the CDR into a first CDR and a second CDR by using the divisional-payment criteria, by using the CDR and divisional-payment criteria registered in advance;

calculate the first portion of the charge corresponding with at least one divisional-payment subscriber by using the first CDR;

calculate the second portion of the charge corresponding with at least one divisional-payment subscriber by using the second CDR;

store the calculated first portion of the charge and second portion of the charge;

calculate a total charge of divisional-payment subscribers engaged in the divisional-payment company by summing up the second portion of charge corresponding to each subscriber; and make a personal-use bill corresponding with the first portion of the charge of at least one divisional-payment subscriber and a divisional-payment subscriber-use bill corresponding with at least one divisional-payment company.

* * * * *